United States Patent [19]

Wooding

[11] Patent Number: 4,534,177
[45] Date of Patent: Aug. 13, 1985

[54] ULTRAHIGH VELOCITY WATER-COOLED COPPER SPINNER

[75] Inventor: Patrick J. Wooding, Moorestown, N.J.

[73] Assignee: Wooding, Indian Mills, N.J.

[21] Appl. No.: 582,400

[22] Filed: Feb. 24, 1984

Related U.S. Application Data

[62] Division of Ser. No. 311,043, Oct. 13, 1981, Pat. No. 4,468,931.

[51] Int. Cl.³ .............................................. F25D 17/02
[52] U.S. Cl. ............................................ 62/64; 65/14
[58] Field of Search ................. 62/64, 373, 376; 65/14

[56] References Cited

U.S. PATENT DOCUMENTS

| | | | |
|---|---|---|---|
| 2,944,284 | 7/1960 | Tillotson et al. | 65/14 |
| 3,054,140 | 9/1962 | Firnhaber | 65/14 |
| 4,032,705 | 6/1977 | Wooding | 373/76 |

Primary Examiner—Ronald C. Capossela
Attorney, Agent, or Firm—Duffield & Lehrer

[57] ABSTRACT

A fiberizing spinner for converting a stream of molten material into a plurality of fibers includes a substantially cylindrically shaped copper shell. A complementary shaped coolant guide is disposed within the shell and is closely spaced from the inner surface thereof so as to define a highly restrictive narrow flow passage. A liquid coolant is supplied to the passage where the velocity of the same is made to accelerate to an ultrahigh velocity of at least 10 feet per second across the inner surface of the shell to thereby sweep away steam generated upon the surface.

3 Claims, 1 Drawing Figure

U.S. Patent  Aug. 13, 1985  4,534,177
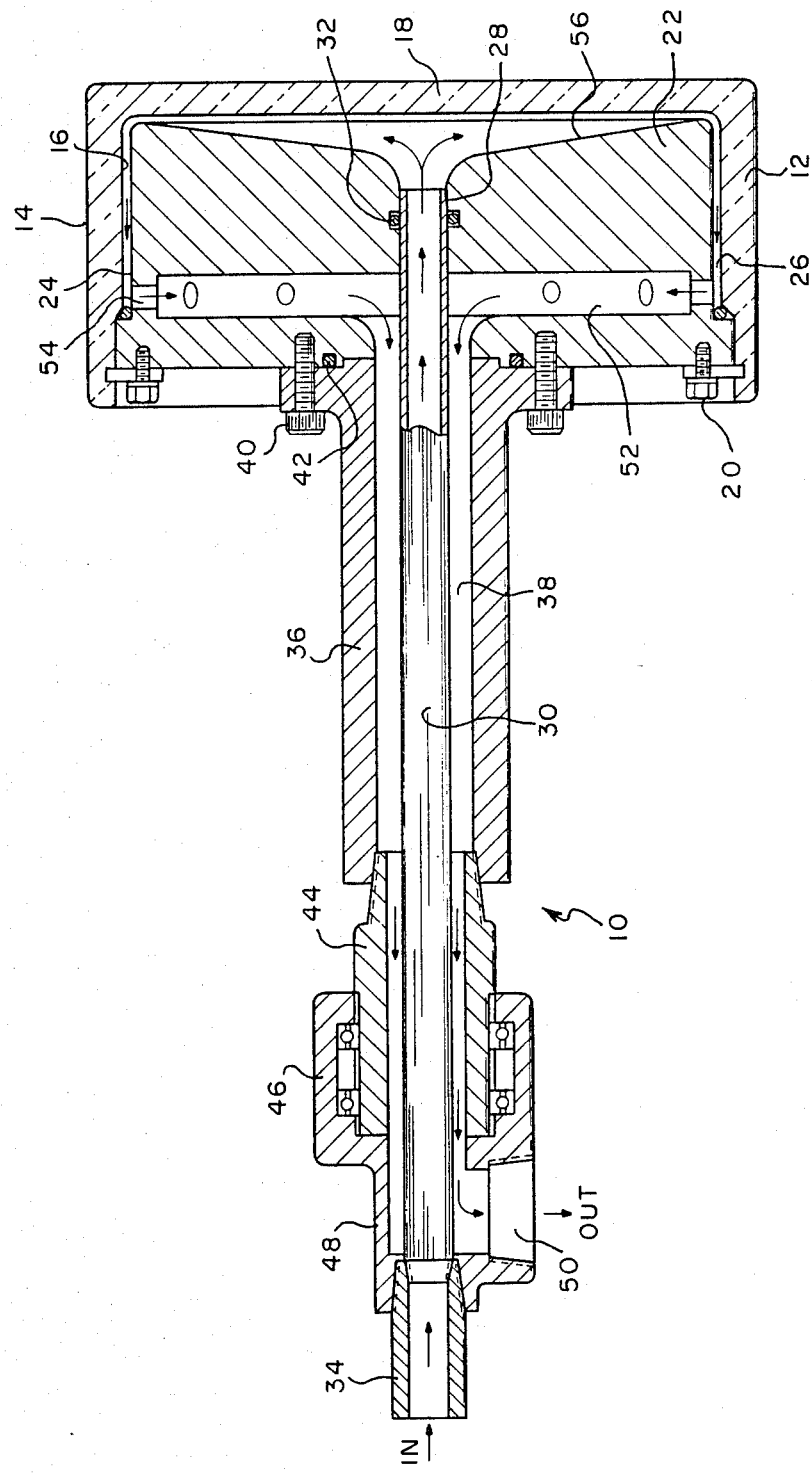

ULTRAHIGH VELOCITY WATER-COOLED COPPER SPINNER

This is a division of prior application Ser. No. 311,043, filed Oct. 13, 1981, now U.S. Pat. No. 4,468,931.

BACKGROUND OF THE INVENTION

The present invention is directed toward a fiberizing spinner for converting molten material into a plurality of fibers and more particularly toward an ultrahigh velocity water-cooled copper spinner.

The function of a fiberizing spinner is to impart kinetic energy to a stream of molten material so that high velocity air, steam or other vapor, impinging on the rapidly moving stream of molten material, can force that stream into a multiplicity of small diameter fibers of considerable length. Such spinners are used, for example, in the manufacture of mineral or "rock" wool fibers for thermal insulation.

For the long fiber, low density mineral wool in general use in the U.S. for attic insulation, single wheel spinners have proved quite effective. For higher density fiber for cavity wall retrofit or industrial pipe covering, ceiling tiles, etc., it is more customary worldwide to use the so-called "four-wheel" spinner.

This four-wheeled spinner consists of 4 parallel, powered spindles each terminating in a water-cooled wheel of 10 to 14 inches in diameter with a 4 to 5 inch rim width, all 4 wheels being mounted in the same plane so that molten material dropping onto the top wheel is given velocity and slung onto the second wheel, and so on. Past the lowest, or third and fourth wheels, high velocity air or steam pushes the now highly energetic molten material laterally with such force that it separates into fibers.

These 4 spinner wheels have in the past been constructed of steel, conventionally water-cooled. As a result, the wheels are worn out by approximately one week's work and have to be refaced at considerable expense.

As explained more fully in Applicant's U.S. Pat. No. 4,032,705 (the entire subject matter thereof being included herein by reference), Applicant has discovered that the rapid, consistent removal of large quantities of energy (in the range of 1 BTU per square inch per second) through a water-cooled metal barrier, without damage to that barrier, requires that the metal have excellent thermal conductivity and a reasonably high melting point, and be force-cooled at a constant temperature by the creation and efficient removal of steam at its back face.

Converting 1 pound of water into steam requires 967 BTU's of heat at 212° F. (or 536 calories per gram at 100° C.). If water can be made to present itself consistently to the area to be cooled and there to turn into steam, and then to leave the area immediately to make room for more water to arrive, a highly efficient and predictable cooling system results. The area to be cooled must, of course, be kept free of accretion to obviate the film effects which are adverse to efficient thermal transfer.

Experimentation has shown that the best way to remove the steam film as rapidly as it forms is by applying ultrahigh velocity cooling water to the back surface of the metal barrier. A cooling water velocity of at least 10 feet per second has proved to be required, and this velocity must be at the surface of the metal, not merely at the center of a substantial cooling passage of which the metal barrier is one of the walls. The preferred water cooling velocity is at least 20 feet per second. It should be readily apparent that such velocities require high flow rates through small passages, thereby generating pressure drops of the order of 20 to 60 psi, depending on the surfaces, shapes and length of the area to be cooled.

To enhance the effectiveness of this cooling, a readily workable metal of reasonable cost and melting point and high thermal conductivity is required. From a table of the physical properties of the elements, a selection of an easily workable, relatively inexpensive material with a melting point about 1,000° C. and good thermal transfer capability results in the following list:

| ELEMENT | MELTING POINT (°C.) | CONDUCTIVITY (calgmcm/sqcm/sec/°C.) |
|---|---|---|
| Chromium (Cr) | 1875 | 0.16 |
| Copper (Cu) | 1083 | 0.943 |
| Iron (Fe) | 1537 | 0.18 |
| Molybdenum (Mo) | 2610 | 0.34 |
| Nickel (Ni) | 1453 | 0.22 |
| Silver (Ag) | 960 | 1.00 (for comparison) |

Chromium, molybdenum and nickel are not really easily workable and they are relatively expensive. Furthermore, these materials have thermal conductivities which are from 3 to 5 times poorer than that of copper.

Because of the relatively low melting point of copper and the corresponding higher melting point of iron, the automatic and quite incorrect choice in the past for a water-cooled spinner has been steel. This has been true even though it has a thermal transfer ability less than 1/5 that of copper. Furthermore, for a number of reasons, the water-cooled steel has a tendency to form films thereon of a highly insulating nature.

Compounding this technical felony is the fact that, to Applicant's knowledge, no attempt has been made to ensure the efficient removal of heat energy from the back face of a spinner by the encouragement of steam formation, against a clean surface, made effective by the immediate removal of that steam by new cooling water moving at "ultrahigh velocity." It should be pointed out that the use of stainless steel only makes matters worse since stainless steel grades have thermal transfer abilities 16 to 24 times poorer than copper.

SUMMARY OF THE INVENTION

The present invention overcomes the problems of the prior art and provides a fiberizing spinner which is protected from wear and which provides a predictable, consistent contour of solidified material or "skull," thereby saving considerable replacement expense and permitting closer control of the fiberization process. The spinner according to the invention includes a substantially cylindrically shaped copper shell. A complementary shaped coolant guide is disposed within the shell and is closely spaced from the inner surface thereof so as to define a highly restrictive narrow flow passage. A liquid coolant is supplied to the passage where the velocity of the same is made to accelerate to an ultrahigh velocity of at least 10 feet per second across the inner surface of the shell to thereby sweep away steam generated upon the surface.

BRIEF DESCRIPTION OF THE DRAWING

For the purpose of illustrating the invention, there is shown in the accompanying drawing one form which is presently preferred; it being understood that the invention is not intended to be limited to the precise arrangements and instrumentalities shown.

The sole FIGURE is a cross-sectional view of an ultrahigh velocity water-cooled copper spinner constructed in accordance with the principles of the present invention.

DETAILED DESCRIPTION OF THE PREFERRED EMBODIMENT

Referring now to the drawing in detail, there is shown in the sole FIGURE a cross-sectional view of an ultrahigh velocity water-cooled copper spinner constructed in accordance with the principles of the present invention and designated generally as 10. Spinner 10 is comprised essentially of a substantially cylindrically shaped copper shell 12 having an outer working surface 14 upon which molten material such as molten slag impinges to receive kinetic energy so that it may be formed into fibers. The copper shell 12 also includes an inner cylindrical surface 16 and an end wall 18 which is integral with the cylindrically shaped portion 12.

Located within the shell 12 and securely fastened thereto through a plurality of bolts 20 is a coolant guide 22. Coolant guide 22 is substantially cylindrically shaped and has and outer cylindrical wall 24. The coolant guide 22 is coaxially arranged within the shell 12 with the surface 24 closely spaced from the inner surface 16 of the shell 12 so as to define a highly restrictive annularly shaped narrow flow passage 26.

Passing axially through the center opening 28 of the guide 22 is an inner conduit 30. The forward end of the conduit 30 is rotatably mounted with respect to the guide 22 but is provided with a liquid seal by the use of O-ring 32. The rearward end of the conduit 30 (the left side as viewed in the FIGURE) terminates in a fixed inlet port 34.

An outer conduit 36 is coaxially disposed around the inner conduit 30 so as to define an annular space 38 therebetween which functions as a return path as will be explained more clearly hereinafter. The forward end of the conduit 36 is secured to the back face of the guide 22 through a plurality of bolts 40 and is sealed thereto by O-ring 42.

The other end of the outer conduit 36 is secured to a first part 44 of a rotating union 46. The other half 48 of the rotating union 46 which is the fixed half thereof is secured to the inner conduit 30 and the inlet port 34. The rotating union 46 is also provided with an outlet port 50 which, as can be seen, is in communication with the annular space or return path 38.

Located within the interior of the guide 22 and adjacent the rearward end thereof (the left side as shown in the FIGURE) is a substantially disc-shaped cavity 52. This cavity 52 is in communication with the annular space or return path 38. The cavity 52 is also in communication with the narrow flow passage 26 through a plurality of holes 54 which pass radially through the guide 22 from the outer surface 24 thereof into the cavity 52. In the preferred embodiment, there are twelve such holes 54 which are equiangularly spaced around the circumference of the guide 22.

The front face 56 of the guide 22 is substantially dish-shaped. That is, the distance between the face 56 and the end wall 18 narrows as the radius increases. As should be recognized by those skilled in the art, this is done to provide constant flow velocity in the space between the surface 56 and the end wall 18. The spinner may be rotated in a conventional manner around its axis by a gear or pulley fixedly secured to the outer conduit 36.

The spinner 10 functions in the following manner. The combined shell 12, guide 22 and outer conduit 36 are rotated at the desired speed and molten material such as molten slag, for example, is made to impinge on the working surface 14 of the copper shell 12 to be formed into fibers. As the molten material contacts the surface 14, intense heat is transferred to the copper shell 12. Water or other desired liquid coolant is forced into the inlet port 34, through the conduit 30 and into the space between the face 56 of the guide 22 and the end wall 18. From there, the liquid coolant passes through the passage 26, through the openings 54 into the cavity 52 and through the return path 38 to the outlet port 50. Because of the highly restrictive narrow flow passage 26 in combination with the pressure of the incoming liquid coolant, the coolant is forced across the inner surface 16 of the copper shell 12 at an ultrahigh velocity of at least 10 feet per second to sweep away steam generated upon this surface, thereby effectively cooling the copper shell 12.

As a result of the effective cooling provided by the present invention, a skin or "skull" of solid slag material of predictable, constant contour freezes on the working surface of the spinner thereby permitting closer control of the fiberization process. Furthermore, this skull is thermally insulating thereby protecting the copper from excessive temperatures. The skull also protects the copper working surface from physical wear.

It should be noted that while port 34 has been referred to as the inlet port and port 50 as the outlet port, these can be reversed. The liquid coolant can be made to flow in the opposite direction entering the port 50 and leaving the port 34 with the same cooling effect. Furthermore, it should be pointed out that the coolant guide 22 and conduits 30 and 36 may also be made from copper or may be made from stainless steel or any other desired material.

The present invention may be embodied in other specific forms without departing from the spirit or essential attributes thereof and accordingly, reference should be made to the appended claims rather than to the foregoing specification as indicating the scope of the invention.

I claim:

1. A method for effectively cooling a spinner having a substantially cylindrically shaped outer surface upon which molten material impinges and a substantially cylindrically shaped inner surface lying behind said outer surface and in thermal contact therewith comprising the step of directing liquid coolant across said inner surface at an ultrahigh velocity of at least 10 feet per second to sweep away steam generated upon said inner surface.

2. The method as claimed in claim 1 wherein a coolant guide having an outer substantially cylindrical surface is coaxially aligned with and closely spaced from said inner surface to define a highly restrictive narrow substantially annularly shaped flow passage between the outer surface of said coolant guide and said inner surface and wherein said liquid coolant is passed through said passage at said ultrahigh velocity.

3. The method for effectively cooling a spinner comprising the step of directing liquid coolant across the inner surface thereof at an ultrahigh velocity of at least 10 feet per second to sweep away steam generated upon said surface.

* * * * *